United States Patent
Van Dine et al.

(10) Patent No.: US 6,514,635 B2
(45) Date of Patent: *Feb. 4, 2003

(54) PROCEDURE FOR SHUTTING DOWN A FUEL CELL SYSTEM HAVING AN ANODE EXHAUST RECYCLE LOOP

(75) Inventors: Leslie L. Van Dine, Manchester, CT (US); Margaret M. Steinbugler, East Windsor, CT (US); Carl A. Reiser, Stonington, CT (US); Glenn W. Scheffler, Tolland, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 114 days.

This patent is subject to a terminal disclaimer.

(21) Appl. No.: 09/770,042

(22) Filed: Jan. 25, 2001

(65) Prior Publication Data

US 2002/0098393 A1 Jul. 25, 2002

(51) Int. Cl.⁷ .................................. H01M 8/00
(52) U.S. Cl. ........................................ 429/17
(58) Field of Search ...................... 429/13, 17

(56) References Cited

U.S. PATENT DOCUMENTS

| | | | |
|---|---|---|---|
| 4,115,627 A | | 9/1978 | Christner et al. ............ 429/44 |
| 4,729,930 A | * | 3/1988 | Beal et al. .................... 429/13 |
| 4,904,547 A | * | 2/1990 | Mizumoto et al. ............ 429/22 |
| 4,965,143 A | * | 10/1990 | Mizuno et al. ................ 429/17 |
| 5,013,617 A | | 5/1991 | Scheffler ...................... 429/17 |
| 5,045,414 A | | 9/1991 | Bushnell et al. .............. 429/17 |
| 5,059,494 A | * | 10/1991 | Vartanian et al. ............ 429/17 |
| 5,503,944 A | | 4/1996 | Meyer et al. ................. 429/13 |
| 5,529,683 A | * | 6/1996 | Critz et al. .................. 502/350 |
| 5,554,453 A | * | 9/1996 | Steinfeld et al. ............. 429/17 |
| 6,025,083 A | | 2/2000 | Veyo et al. ................... 429/13 |
| 6,376,112 B1 | * | 4/2002 | Clingerman et al. ......... 429/17 |
| 2002/0076583 A1 | * | 6/2002 | Reiser et al. ................. 429/13 |

FOREIGN PATENT DOCUMENTS

EP 842548 * 8/1999 ............ H01M/8/04

* cited by examiner

Primary Examiner—Stephen Kalafut

(57) ABSTRACT

A procedure for shutting down an operating fuel cell system that recirculates a portion of the anode exhaust in a recycle loop, includes disconnecting the primary load from the external circuit, stopping the flow of air to the cathode, and applying an auxiliary resistive load across the cells to reduce and/or limit cell voltage and reduce the cathode potential while fuel is still flowing to the anode and the anode exhaust is recirculating. The fuel flow is then stopped, but the anode exhaust continues to be circulated in the recycle loop to bring the hydrogen therein into contact with a catalyst in the presence of oxygen to convert the hydrogen to water, such as in a catalytic burner. The recirculating is continued until substantially all the hydrogen is removed. The cell may then be completely shut down. No inert gas purge is required as part of the shut-down process.

34 Claims, 2 Drawing Sheets

PROCEDURE FOR SHUTTING DOWN A FUEL CELL SYSTEM HAVING AN ANODE EXHAUST RECYCLE LOOP

BACKGROUND OF THE INVENTION

1. Technical Field

This invention relates to fuel cell systems and, more particularly, to procedures for shutting down an operating fuel cell system.

2. Background Information

It is well known in the fuel cell art that, when the electrical circuit is opened and there is no longer a load across the cell, such as upon and during shut-down of the cell, the presence of air on the cathode, coupled with hydrogen fuel remaining on the anode, often cause unacceptable anode and cathode potentials, resulting in catalyst and catalyst support oxidation and corrosion and attendant cell performance degradation. It was thought that inert gas needed to be used to purge both the anode flow field and the cathode flow field immediately upon cell shut-down to passivate the anode and cathode so as to minimize or prevent such cell performance degradation. Further, the use of an inert gas purge avoided the possible occurrence of a flammable mixture of hydrogen and air, which is a safety issue. While the use of 100% inert gas as the purge gas is most common in the prior art, commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of purge to lower the cathode potential rapidly to between the acceptable limits of 0.3–0.7 volt.

It is undesirable to use nitrogen or other inert gas as a shut-down or start-up purge gas for fuel cells where compactness and service interval of the fuel cell powerplant is important, such as for automotive applications. Additionally, it is desired to avoid the costs associated with storing and delivering inert gas to the cells. Therefore, safe, cost effective shut-down and start-up procedures are needed that do not cause significant performance degradation and do not require the use of inert gases, or any other gases not otherwise required for normal fuel cell operation.

BRIEF SUMMARY OF THE INVENTION

In accordance with the present invention, a fuel cell system, which recirculates a portion of the anode flow field exhaust through the anode flow field in a recycle loop during operation, is shut-down by disconnecting the primary load from the external circuit and thereafter stopping the flow of fresh hydrogen containing fuel into the anode flow field and catalytically reacting hydrogen in the recirculating anode exhaust by recirculating such gases within the recycle loop into contact with a catalyst until substantially all the hydrogen in such gases is removed. Preferably, before the flow of fuel to the anode is stopped, upon disconnecting the primary load the oxidant flow to the cathode flow field is halted and a small auxiliary load is connected across the cell for a period of time to lower the cell voltage and cathode potential. An inert gas purge of the cell is not used or required as part of the shut-down procedure.

In one experiment using a stack of PEM fuel cells of the general type described in commonly owned U.S. Pat. No. 5,503,944, the primary electricity using device was disconnected, and the flow of fuel (hydrogen) to the anode and the flow of air to the cathode were shut off. No attempt was made to purge the anode flow field of residual fuel or to purge the cathode flow field of air, such as by using an inert gas purge. To restart the cell, fuel and oxidant were flowed directly into their respective flow fields. (The foregoing procedure is hereinafter referred to as an "uncontrolled" start/stop cycle.) It was found that a cell stack assembly operated in this manner experienced rapid performance decay which had not previously been observed. Further, it was discovered that a large number of start/stop cycles were more detrimental to cell performance than were a large number of normal operating hours under load. It was eventually determined, through experimentation, that both the shut-down and start-up procedures were contributing to the rapid performance decay being experienced by the cell; and it was known that such rapid decay did not occur when, in accordance with prior art techniques, inert gas was used to passivate the cell at each shut down. Examination of used cells that experienced only a few dozen uncontrolled start/stop cycles showed that 25% to 50% of the high surface area carbon black cathode catalyst support was corroded away, which had not previously been reported in the prior art.

Further testing and analysis of results led to the belief that the following mechanism caused the performance decay experienced in the foregoing experiment: With reference to FIG. 2, a diagrammatic depiction of a PEM fuel cell is shown. (Note that the mechanism to be described is also applicable to cells using other electrolytes, such as phosphoric acid or potassium hydroxide with appropriate changes in ion fluxes.) In FIG. 2, M represents a proton exchange membrane (PEM) having a cathode catalyst layer C on one side and an anode catalyst layer A on the other side. The cathode air flow field carrying air to the cathode catalyst is divided into air zones 1 and 2 by a vertical dotted line that represents the location of a moving hydrogen front through the anode flow field, as further described below. The anode fuel flow field that normally carries hydrogen over the anode catalyst from an inlet I to an exit E is also divided into two zones by the same dotted line. The zone to the left of the dotted line and adjacent the inlet I is filled with hydrogen and labeled with the symbol $H_2$. The zone to the right of the dotted line and adjacent the exit E is zone 3 and is filled with air.

Upon an uncontrolled shut-down (i.e. a shut-down without taking any special steps to limit performance decay) some of the residual hydrogen and some of the oxygen in their respective anode and cathode flow fields diffuse across the PEM (each to the opposite side of the cell) and react on the catalyst (with either oxygen or hydrogen, as the case may be) to form water. The consumption of hydrogen on the anode lowers the pressure in the anode flow field to below ambient pressure, resulting in external air being drawn into the anode flow field at exit E creating a hydrogen/air front (the dotted line in FIG. 2) that moves slowly through the anode flow field from the fuel exit E to the fuel inlet I. Eventually the anode flow field (and the cathode flow field) fills entirely with air. Upon start-up of the cell, a flow of air is directed into and through the cathode flow field and a flow of hydrogen is introduced into the anode flow field inlet I. On the anode side of the cell this results in the creation of a hydrogen/air front (which is also represented by the dotted line in FIG. 2) that moves across the anode through the anode flow field, displacing the air in front of it, which is pushed out of the cell. In either case, (i.e. upon shut-down and upon start-up) a hydrogen/air front moves through the cell. On one side of the moving front (in the zone $H_2$ in FIG.

2) the anode is exposed substantially only to fuel (i.e. hydrogen); and in zone 1 of the cathode flow field, opposite zone $H_2$, the cathode is exposed only to air. That region of the cell is hereinafter referred to as the $H_2$/air region: i.e. hydrogen on the anode and air on the cathode. On the other side of the moving front the anode is exposed essentially only to air; and zone 2 of the cathode flow field, opposite zone 3, is also exposed to air. That region of the cell is hereinafter referred to as the air/air region: i.e. air on both the anode and cathode.

The presence of both hydrogen and air within the anode flow field results in a shorted cell between the portion of the anode that sees hydrogen and the portion of the anode that sees air. This results in small in-plane flow of protons ($H^+$) within the membrane M and a more significant through-plane flow of protons across the membrane, in the direction of the arrows labeled $H^+$, as well as an in-plane flow of electrons ($e^-$) on each side of the cell, as depicted by the arrows so labeled. The electrons travel through the conductive catalyst layers and other conductive cell elements that may contact the catalyst layer. On the anode side the electrons travel from the portion of the anode that sees hydrogen to the portion that sees air; and on the cathode side they travel in the opposite direction.

The flow of electrons from the portion of the anode that sees hydrogen to the portion of the anode that sees air results in a small change in the potential of the electron conductor. On the other hand, electrolytes in the membrane are relatively poor in-plane proton conductors, and the flow of protons results in a very significant drop in the electrolyte potential between zones $H_2$ and 3.

It is estimated that the reduction in electrolyte potential between zones $H_2$ and 3 is on the order of the typical cell open circuit voltage of about 0.9–1.0 volts. This drop in potential results in a proton flow across the PEM, M, from the cathode side, zone 2, to the anode side, zone 3, which is the reverse direction from what occurs under normal cell operating conditions. It is also estimated that the reduction in electrolyte potential in the portion of the anode that sees air (in zone 3) results in a cathode potential in zone 2 of approximately 1.5 to 1.8 volts, versus the normal cathode potential of 0.9 to 1.0 volts. (Note: These potentials are relative to the hydrogen potential at the same operating conditions.) This elevated cathode potential results in rapid corrosion of the carbon support material and the cathode catalyst, causing significant cell performance decay.

One object of the present invention is to minimize corrosion of the fuel cell catalyst and catalyst support during shut-down of the fuel cell, and to do it without purging hydrogen from the cells with inert gas upon shut-down.

In one particular embodiment of the shut-down procedure of the present invention, after the steps of disconnecting the primary load from the external circuit and shutting off the fresh fuel flow into the anode flow field, the anode exhaust is recirculated through the anode flow field in a recycle loop to continuously bring hydrogen remaining within the loop into contact with the anode catalyst of the cells to react with oxygen that diffuses across the cell from the cathode flow field to the anode flow field. The oxygen combines with the hydrogen in the presence of the anode catalyst to produce water, thereby "consuming" the free hydrogen molecules. In this embodiment, air flow through the cathode flow field is preferably continued during the recirculation of the anode exhaust to increase the availability of oxygen for diffusion across the cell to react with the hydrogen on the anode catalyst. After substantially all the hydrogen has been reacted, the recirculation of the anode flow field exhaust may be stopped and the anode and cathode flow fields may be allowed to fill with air or, preferably, are both purged with air. This completes the shut-down procedure without the use of an inert gas purge and without generating a hydrogen/air front within the anode flow field. The optional air purge assures that even the smallest amounts of hydrogen are flushed from the cell, and that the anode and cathode flow field gasses remaining in the cell after shut-down are essentially identical (i.e. 100% air).

In a variation of the foregoing embodiment, rather than rely solely on oxygen diffusion across the cell to catalytically consume the recirculating hydrogen, a small controlled amount of external air is mixed with the recirculating anode flow field exhaust upstream of the point where that exhaust enters the anode flow field inlet. This speeds up the shut-down process by increasing the speed of the catalytic reaction on the anode, reducing the cathode potential and thereby reducing the rate of catalyst corrosion and rate of catalyst support corrosion during the shut-down process. Once added, the external air is circulated with the anode flow field exhaust until substantially all the remaining hydrogen has been reacted. (Hereinafter the controlled amount of external air which is added to speed up the catalytic reaction is referred to as "reaction air". This nomenclature is used to distinguish the reaction air from external air that may be added later in the shut-down procedure to purge the flow fields.) The hydrogen and the oxygen in the recirculating mixture of anode exhaust and air catalytically react with each other on the anode catalyst to produce water. Since, during this step of the procedure, only a mixture of air and anode exhaust enter the anode flow field, there is no distinct hydrogen/air front traversing the anode flow field; and at no time does one region of the anode see only hydrogen and the other see only air.

The oxygen in the added external air reacts on the anode catalyst with the hydrogen to quickly consume (in a matter of seconds for all systems of a practical size) substantially all of the remaining hydrogen in the recirculating gases. A typical 70 kilowatt fuel cell has a hydrogen inventory within the fuel flow fields, reactant manifolds and the recycle loop of about 12 liters, while the recycle blower is typically sized to recirculate 400 to 700 liters/minute. An air flow rate into the fuel recycle loop of approximately 140 liters/minute maintains the air concentration below the flammability limit (explained more fully, below) while providing sufficient oxygen to consume substantially all the hydrogen in about 13 seconds.

The reaction of hydrogen with the oxygen in either the external air or with the oxygen that is transported from the cathode to the anode through the membranes results in a pressure reduction in the recycle loop. It is undesirable to have the pressure in the recycle loop drop below ambient pressure since this would result in drawing an uncontrolled quantity of air into the recycle loop due to any system leaks. However, all practical size recycle blowers and recycle loop volumes, when taken together with the quantity of external air that can safely be brought into the system, will result in maintaining the pressure above the ambient pressure thus preventing any random infusion of air into the system.

Except in certain specific instances which are described later with respect to certain embodiments of the present invention, for safety reasons, the amount of air added into the recycle loop while hydrogen is present should be less than an amount that would result in a flammable mixture of hydrogen and oxygen. More than about 4% oxygen (equivalent to about 20% air), by volume, in hydrogen is considered in excess of the flammability limit; and more than about 4%, by volume, hydrogen in air is considered in excess of the flammability limit. Thus, if the recycle loop contains 100% hydrogen, the rate of air flow into the recycle loop should initially not exceed about 20% of the total recycle loop flow rate, and is preferably lower than 20% to allow a safety margin. Although not shown, a device for measuring the ratio of oxygen to hydrogen in the circulating gases may be placed in the recycle loop and used to control valves or other devices used to feed gases into the recycle loop.

It should be noted that, during the shut-down procedure of the present invention, nitrogen naturally present in the air on the cathode side of the cell diffuses across the cell into the anode flow field along with the oxygen. Also, there is nitrogen in any air added to the recirculating anode exhaust. None of that nitrogen is consumed within the cell. Therefore, in order to add air to the recirculating exhaust, the recirculating exhaust must be partially vented. After substantially all the hydrogen has been consumed, any gas mixture within the cell containing nitrogen in excess of the amount found in air may eventually be displaced by fresh air that is allowed to enter the cell after shut-down or as a result of using a final air purge, as described above. However, it is not critical to remove excess nitrogen from the cell. For the embodiments just described, in order to speed up the shut-down process, it is preferable to reduce the cathode potential prior to shutting off the flow of hydrogen fuel to the anode flow field and prior to adding any controlled amount of external air into the anode flow field. More specifically, to quickly reduce the cell voltage while still flowing fuel to the anode, but after the primary load has been disconnected, a small auxiliary resistive load is connected across the cell. The air flow to the cathode is halted during application of this auxiliary load. The application of the auxiliary load reduces the amount of oxygen in the cathode flow field through the occurrence of normal electrochemical reactions, and this reduces the cell voltage and cathode potential. The reduction in cathode potential reduces the rate of catalyst and catalyst support corrosion upon air entering the anode flow field during the remaining steps of the cell shut-down process.

The auxiliary load is connected for a period of time long enough to reduce the cell voltage to a preselected value, preferably a value of 0.20 volts or less per cell whereby substantially all the oxygen in the cathode flow field will have been consumed. After the cell voltage has been reduced to the desired value, the fuel flow to the anode flow field is shut off and a controlled amount of air may be added to the anode flow field which continues to recirculate to catalytically react hydrogen therein, all in accordance with the previously described embodiments, until substantially all the hydrogen has been removed from the anode flow field. The auxiliary load may be disconnected once the cell voltage has dropped to the desired level; but it is preferable to keep it connected until the shut-down process is completed. Thus, if the shut-down procedure is to end with an air purge of the anode and cathode flow fields (as previously mentioned), it is preferred to maintain the auxiliary load connected across the cell to limit the per cell voltage to 0.2 volt or less during the air purge. This minimizes the cathode potential and possible catalyst and catalyst support damage that could result from a) the presence of even very small amounts of hydrogen within the recycle loop, and, b) from any difference in anode potential from the anode air inlet to the anode exhaust outlet as the purge air flows through the cell.

In yet another embodiment of the shut-down procedure of the present invention, the recycle loop includes one or more burners, in series, each having a catalytic burner element therein. After the primary load has been disconnected from the external circuit and fresh fuel flow into the anode flow field has been shut off (such as in accordance with the previously described embodiments), and preferably after the cell voltage has been reduced to 0.2 volts or less (such as with the use of an auxiliary load), a small, controlled amount of external air (i.e. reaction air) is added to the recycle loop either upstream of the burners or, most preferably, directly into each burner. Hydrogen in the recirculating anode flow field exhaust catalytically reacts on the burner element with the oxygen in the air to produce water. The exhaust from the burner is continuously recirculated through the recycle loop (i.e. through the anode flow field and burners) until substantially all the hydrogen has been reacted. As discussed earlier, the amount of air added to the recirculating anode flow field exhaust is regulated to avoid having a flammable mixture of hydrogen and oxygen anywhere within the recycle loop. Preferably the shut down process should take no more than one minute, and most preferably less than ten seconds. For that reason, a plurality of burners is preferred over a single burner.

Preferably, each burner includes a diffusion burner upstream of and in series with the catalytic burner element, and preferably integrated within the same housing. The diffusion burner includes an igniter that is used to initiate the diffusion burning of the air and hydrogen entering the diffusion burner. The diffusion burning process speeds up the shut-down process by more quickly consuming the hydrogen in the recycle stream (as compared to catalytic burning alone); however, diffusion burning alone is not as effective as catalytic burning for removing the hydrogen to the levels required of the present invention. The combination of the two provide the desired speed and substantially complete removal of the hydrogen. The flammability limits, which, as discussed above, should be observed for safety within the fuel cell system, obviously do not apply to the diffusion burner; however, the flammability limits should be observed with regard to the gas composition leaving the diffusion burning zone.

The following commonly owned U.S. non-provisional patent applications, filed on Dec. 20, 2000, describe and claim inventions related to the subject matter of this application: U.S. Ser. No. 742,497 "Procedure for Shutting Down a Fuel Cell System Using Air Purge", invented by Carl Reiser, Richard Sawyer and Deliang Yang; and U.S. Ser. No. 742,481 "Procedure for Starting Up a Fuel Cell System Using a Fuel Purge", invented by Carl Reiser, Richard Sawyer, and Deliang Yang. The following commonly owned U.S. non-provisional patent application, filed on even date herewith and now abandoned, describe and claim inventions related to the subject matter of the present application: U.S. Ser. No. 09/769,897 "Procedure for Starting Up a Fuel Cell System Having an Anode Exhaust Recycle Loop", invented by Deliang Yang, Margaret Steinbugler, Richard Sawyer, Leslie Van Dine, and Carl Reiser.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
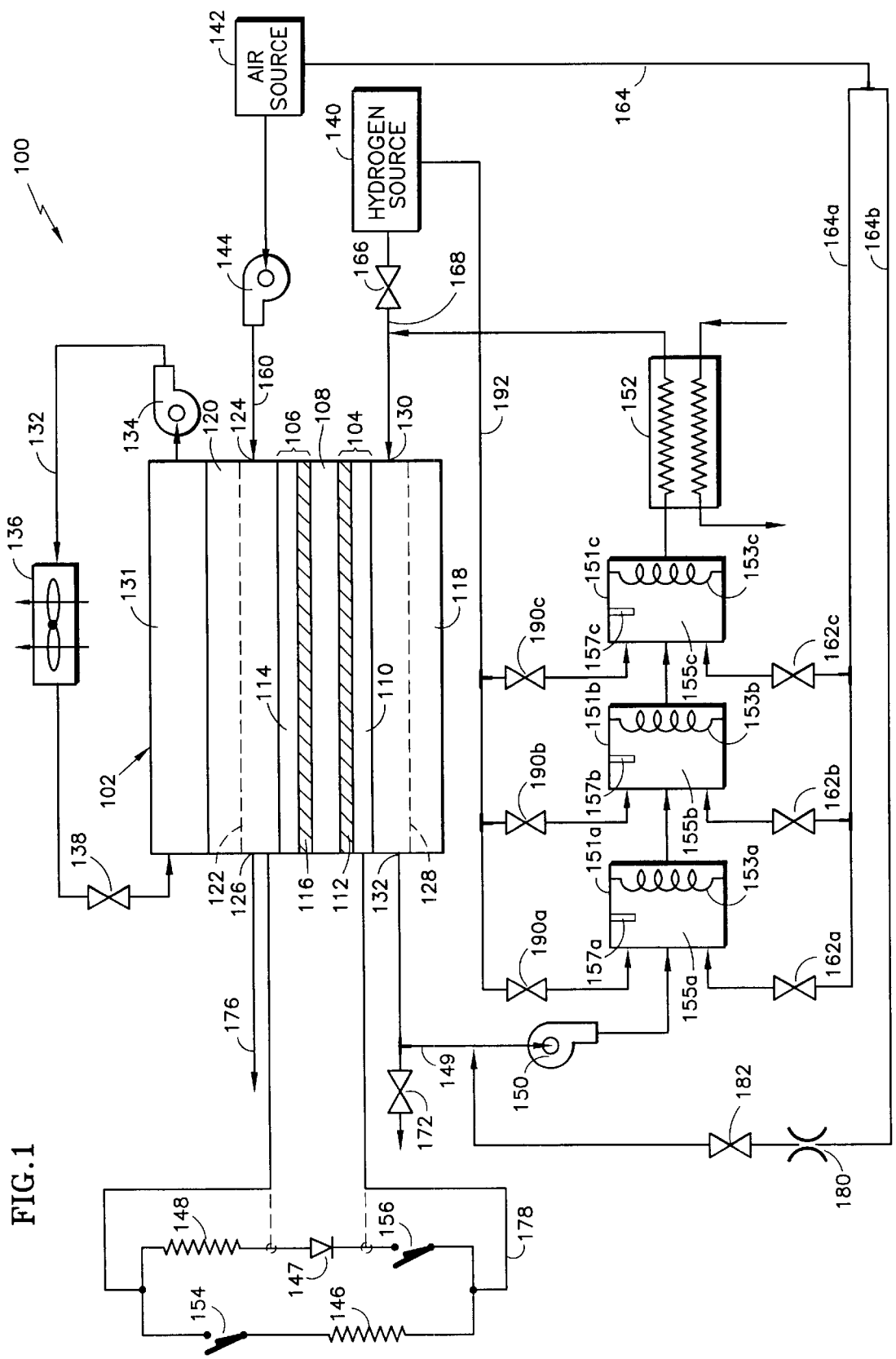
FIG. 1 is a schematic depiction of a fuel cell system that may be operated in accordance with the shut-down procedures of the present invention.
Figure 2:
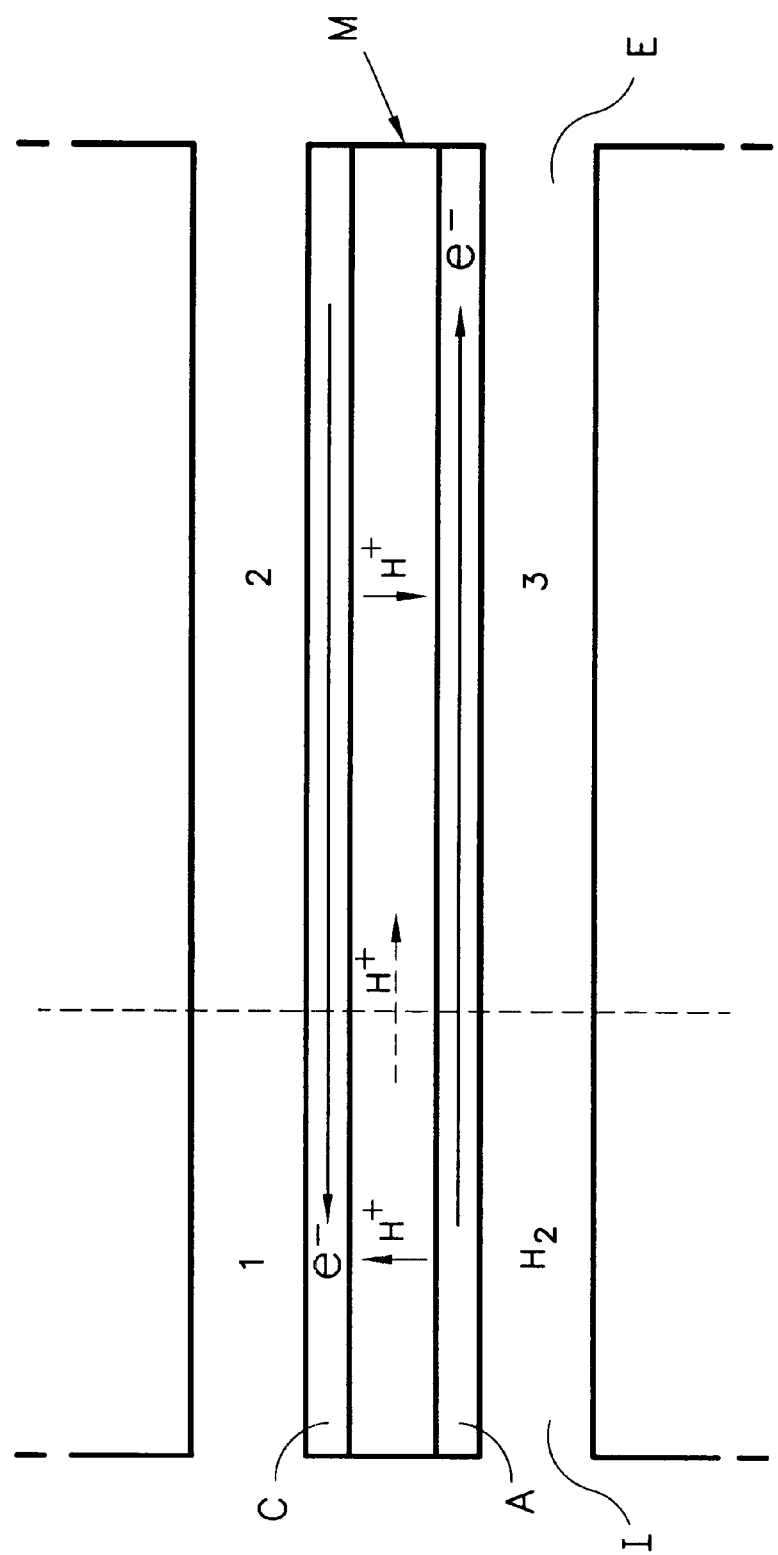
FIG. 2 is a diagrammatic view of a fuel cell cross-section used to explain a mechanism that may cause cell performance degradation during start-up and shut-down.

In FIG. 1, a fuel cell system 100 is shown. The system includes a fuel cell 102 comprising an anode 104, a cathode 106, and an electrolyte layer 108 disposed between the anode and cathode. The anode includes an anode substrate 110 having an anode catalyst layer 112 disposed thereon on the side of the substrate facing the electrolyte layer 108. The cathode includes a cathode substrate 114, having a cathode catalyst layer 116 disposed thereon on the side of the substrate facing the electrolyte layer 108. The cell also includes an anode flow field plate 118 adjacent the anode substrate 110 and a cathode flow field plate 120 adjacent the cathode substrate 114.

The cathode flow field plate 120 has a plurality of channels 122 extending thereacross adjacent the cathode substrate forming a cathode flow field for carrying an oxidant, preferably air, across the cathode from an inlet 124 to an outlet 126. The anode flow field plate 118 has a plurality of channels 128 extending thereacross adjacent the anode substrate forming an anode flow field for carrying a hydrogen containing fuel across the anode from an inlet 130 to an outlet 132. Each cell also includes a cooler 131 adjacent the cathode flow field plate 120 for removing heat from the cell, such as by using a water pump 134 to circulate water through a loop 132 that passes through the cooler 131, a radiator 136 for rejecting the heat, and a flow control valve or orifice 138.

Although only a single cell 120 is shown, in actuality a fuel cell system would comprise a plurality of adjacent cells (i.e. a stack of cells) connected electrically in series, each having a cooler separating the cathode flow field plate of one cell from an anode flow field plate of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte layer is a proton exchange membrane (PEM). The '627 patent describes a phosphoric acid electrolyte fuel cell wherein the electrolyte layer is a porous silicon carbide matrix layer containing liquid electrolyte within its pores.

Referring, again, to FIG. 1, the fuel cell system includes a source 140 of hydrogen containing fuel, under pressure, a source 142 of air, an air blower 144, a primary electricity using device referred to herein as the primary load 146, a diode 147, an auxiliary resistive load 148 in series with the diode, and an anode exhaust recycle loop 149. For purposes of this application and the appended claims, the recycle loop 149 is considered to include the anode catalyst layer 112, the porous anode substrate 110, as well as the channels 128 that define the anode flow field.

Disposed in the recycle loop is a recycle loop blower 150, a plurality of burners 151a, 151b, 151c, and a recycle loop heat exchanger 152. Each burner includes an electrically heated, catalytically coated burner element therewithin designated 153a, 153b, 153c, respectively. Within each burner, upstream of each catalytic element, is a diffusion burning zone 155a, 155b, and 155c, respectively. Extending into each such zone is an igniter 157a, 157b, and 157c, respectively. A branch 164a of a conduit 164 from the air source 142 carries air to separate air feed valves 162a, 162b, 162c, which control the flow of air into each diffusion burning zone. (If desired, the air feed valves 162a, 162b, and 162c could be fixed orifices, in which case there would be a single air shut-off valve (not shown) in the conduit 164 upstream of all the air feed orifices.) A branch 164b carries air into the recycle loop, preferably upstream of the blower 150. The branch 164b includes a restricting orifice 180 and an air bleed control valve 182 for controlling the flow. A conduit 192 from the fuel source 140 carries fuel to separate fuel feed valves 190a, 190b, 190c, which control the flow of fuel into each diffusion burner zone. (If desired, the fuel feed valves 190a, 190b, and 190c could be fixed orifices, in which case there would be a single fuel shut-off valve (not shown) in the conduit 192 upstream of all the fuel feed orifices.)

Although only a single heat exchanger 152 is shown located immediately downstream of the burners, there are other possible locations for the heat exchanger, and more than one may be used. For example, there may be a heat exchanger located immediately downstream of each burner; or each burner may have a heat exchanger integral therewith. The type of heat exchanger used and its location are not considered part of the present invention.

Normal Fuel Cell Operation

During normal fuel cell operation, when the cell providing electricity to the primary load 146, a primary load switch 154 is closed (it is shown open in the drawing), and an auxiliary load switch 156 is open. The air blower 144, the anode flow field exhaust recycle blower 150 and the coolant pump 134 are all on. The valve 182 is closed. A fuel feed valve 166 in a fuel feed conduit 168 to the anode flow field is open, as is an anode exhaust vent valve 172 in an anode exhaust conduit. The coolant loop flow control valve 138 is also open. The air feed valves 162a, 162b, and 162c and the fuel feed valves 190a, 190b, and 190c are closed; and the catalytic burner elements 153a, 153b, 153c are off.

Thus, during normal operation, air from the source 142 is continuously delivered into the cathode flow field inlet 124 via the conduit 160 and leaves the outlet 126 via a conduit 176. A hydrogen containing fuel from the pressurized source 140 is continuously delivered into the anode flow field via the conduit 168. A portion of the anode exhaust containing depleted hydrogen fuel leaves the anode flow field through the vent valve 172, while the recycle blower 150 recirculates the balance of the anode exhaust through the anode flow field via the recycle loop in a manner well know in the prior art. Recycling a portion of the anode exhaust helps maintain a relatively uniform gas composition from the inlet 130 to the outlet 132 of the anode flow field. As the hydrogen in the circulating gases passes through the anode flow field, it electrochemically reacts on the anode catalyst layer in a well-known manner to produce protons (hydrogen ions) and electrons. The electrons flow from the anode 104 to the cathode 106 through an external circuit 178 to power the load 146.

Shut-Down Procedures

In one embodiment of the present invention, the burners 151a, 151b, and 151c are not used during shut-down nor during normal operation and may be dispensed with. In such a case, the operating fuel cell system is preferably shut down as follows: The switch 154 in the external circuit 178 is opened to disconnect the primary load 146. The fuel flow valve 166 is left open; the anode exhaust vent valve 172 is left open; the recycle blower remains on to continue recirculation of a portion of the anode exhaust; and the air blower 144 is turned off to halt the flow of fresh air to the cathode flow field. Upon disconnecting the primary load, the auxiliary load 148 is connected by closing the switch 156. With current flowing through the auxiliary load, typical electrochemical cell reactions occur, causing the oxygen concentration in the cathode flow field to be reduced and cell voltage to be lowered.

The auxiliary load is applied at least until the cell voltage is significantly lowered, preferably to a value of 0.2 volts per cell or less (or to some other preselected value). The diode 147, connected across the cathode and anode, senses the cell voltage and allows current to pass through the load 148 whenever the cell voltage is above the preselected value. In that way the cell voltage is limited to the preselected value. In this preferred embodiment, when the fuel cell voltage falls to 0.2 volts per cell, the fuel valve 166 is closed and the air bleed valve 182 is opened. (The auxiliary load may now be disconnected; but it is preferred to leave it connected throughout the remainder of the shut down procedure to limit the cell voltage to 0.2 volts per cell throughout the shut-down procedure.) Upon opening the valve 182, a small, controlled amount of air is introduced, through a restricting orifice 180 in the conduit 164*b*, into the recirculating portion of anode exhaust stream just upstream of the recycle blower 150. This additional air flow increases the rate of the catalytic reaction of hydrogen and oxygen on the anode catalyst. As mentioned above, the amount of this air (referred to, above, as "reaction air") allowed into the recycle loop must not exceed an amount that would result in a flammable mixture of hydrogen and air.

The recirculation of the anode exhaust is continued until substantially all the hydrogen has been consumed (i.e. catalytically reacted with oxygen on the anode to produce water). If the auxiliary load is still connected, it may disconnected, and the shut-down process is complete. Alternatively, the final step of the shut-down process may be an air purge of the recycle loop and cathode flow field even after substantially all the hydrogen has been consumed. The air purge assures that absolutely all the hydrogen has been removed and that identical gas compositions, such as pure air, are present on both sides of the cell while the cell remains idle until it is time to restart. Preferably the auxiliary load remains connected during the purge. The air for purging is provided to the anode flow field inlet 130 by having the valve 182 open while the recycle blower is on. Air is provided to the cathode flow field inlet 124 via the conduit 160 using the air blower 144. After the purge the auxiliary load is be disconnected, completing the shut-down.

The rate of oxygen diffusion across the cell from the cathode to the anode -during the shut-down procedure will be determined by the nature of the electrolyte layer 108, as well as the oxygen and hydrogen concentration gradients across the electrolyte layer. The more permeable the electrolyte layer is to oxygen and hydrogen, respectively, the higher the rate of diffusion of each of those gases. In some applications the rate of diffusion may be sufficient to consume the hydrogen on the anode sufficiently quickly such that it may not be necessary to add reaction air to the recycle loop through the conduit 164*a*. In all likelihood, however, for most applications it will be preferred or necessary to add reaction air directly to the recirculating gases as described above. Since such air is added upstream of the anode flow field inlet 130, it mixes with the recirculating anode exhaust before entering the cell, thereby avoiding the creation of the hydrogen/air front which is believed to cause the excessively high cathode potentials that result in corrosion of both the catalyst and the catalyst support material.

In fuel cell systems wherein anode and cathode flow field plates, such as the plates 118, 120, or the like are porous and used to both carry gasses to the cell anode and cathode and to transport water away from the cells, the coolant loop pump, such as the pump 134, should remain on during the shut-down procedure. This assures that water does not block the pores and prevent or limit the reactant gasses from reaching the anode and cathode catalysts.

Turning, now, to another embodiment of the present invention, the burners 151*a*, 151*b*, and 151*c* are used to remove the hydrogen from the anode flow field. More specifically, the shut-down procedure for an operating fuel cell system 100 would be as follows: The primary load 146 is disconnected and the fresh fuel flow to the anode flow field is shut off by closing the valve 166. The fuel valves 190*a*, 190*b* and 190*c* are closed. With the valve 172 partially open, a portion of the anode flow field exhaust gases are recirculated through the recycle loop by the recycle blower 150 and pass through the plurality of burners 151*a*, 151*b*, and 151*c*. The burners are supplied with a controlled amount of air (reaction air) through the valves 162*a*, 162*b*, and 162*c*. For safety reasons, the amount of air supplied to the catalytic burners must not exceed an amount that could result in a flammable mixture of air and hydrogen leaving the last burner in the series.

In the first burner 151*a*, the external air and recirculating anode exhaust enters the preferred, but optional, diffusion burning zone 155*a* where it is ignited by the igniter 157*a*. Some of the hydrogen in the recirculating anode exhaust not consumed in the diffusion burning zone 155*a* catalytically reacts with unconsumed oxygen on the catalytic burner element 153*a* to produce water. The exhaust from the burner 151*a* enters the next burner in the series, and hydrogen in that stream is consumed in the same manner, and so forth, until the recirculating exhaust has passed through all the burners and again passes through the anode flow field. As with the previous embodiment, the recirculation of the anode flow field exhaust, as well as the diffusion and catalytic burning are continued until substantially no hydrogen remains within the anode flow field. As a final step in the process, an air purge of both the anode and cathode flow fields may then be conducted, as in previously described embodiments.

As a result of the burning process, the recirculating gas becomes nitrogen rich, although some of the nitrogen and some of any unburned air added to the burners (as well as some hydrogen) is vented through the partially open valve 172. Excess nitrogen in the anode flow field during shut-down is not harmful; however the use of a final air purge will remove the excess nitrogen.

Some hydrogen is catalytically converted to water on the anode during the shut-down procedure of this embodiment. However, since the amount of hydrogen converted to water on the anode is small, in comparison the amount converted in the burners, air flow to the cathode flow field during use of the burners is not needed (although it is not be harmful), and the air blower 144 may remain off. For the same reason, additional air via the orifice 180 and valve 182 is unnecessary while the burners are operating. Thus, in this embodiment all air introduced into the recycle loop is preferably through the valves 162*a*, 162*b*, and 162*c*.

As was the case with the embodiment of the present invention that did not involve use of the burners, and for the very same reasons, an optional but preferred additional step may be taken after disconnecting the primary load 146 and prior to shutting off the fuel flow to the anode flow field. That step is to operate the cell for a short period of time on the auxiliary load 148 with the air blower 144 off until the cell voltage is significantly lowered, preferably to a value of 0.2 volts per cell or less. That is done by closing the switch 156 in the external circuit. The air blower 144 should be off while the auxiliary load is connected. As before, application of the auxiliary load quickly reduces cell voltage and cathode potential. Once the desired reduction in voltage is achieved, the previously described steps involving the diffusion burning and catalytic burning of hydrogen in the burners 151a, 151b, and 151c are taken. Once again, it is preferred, but not required, that the auxiliary load remain connected through the end of the shut-down process.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A procedure for shutting down an operating fuel cell system, wherein, during operation of the fuel cell system, a continuous flow of oxidant is being provided to a fuel cell cathode from an oxidant source through a cathode flow field on one side of an electrolyte, and a continuous flow of hydrogen containing fuel is being provided to a fuel cell anode from a primary fuel source through an anode flow field on the other side of the electrolyte, and an electric current is being generated by the fuel cell within an external circuit and is operating a primary electricity using device in the external circuit, the procedure including the following steps:
   (A) disconnecting the primary electricity using device from the external circuit and stopping the flow of fuel from the primary fuel source into the anode flow field; and, then
   (B) catalytically reacting hydrogen in the anode flow field with oxygen by recirculating the anode exhaust through the anode flow field in a recycle loop into contact with a catalyst within the recycle loop to catalytically consume hydrogen, and continuing such recirculation and catalytic consumption of hydrogen until substantially all the hydrogen in the anode flow field has been removed.

2. The shut-down procedure according to claim 1, wherein, in step (B) the hydrogen is catalytically reacted with oxygen at the anode to produce water.

3. The shut-down procedure according to claim 2, wherein step (B) includes increasing the rate of catalytically reacting hydrogen on the anode by passing air through the cathode flow field as the anode exhaust is being recirculated to increase the rate of oxygen diffusion through the cell from the cathode to the anode.

4. The shut-down procedure according to claim 1, wherein step (B) includes adding reaction air to the recirculating anode exhaust in the recycle loop upstream of the anode flow field inlet to provide additional oxygen for said step of catalytically reacting the hydrogen.

5. The shut-down procedure according to claim 1, wherein after substantially all the hydrogen has been consumed, purging the anode and cathode flow fields with air.

6. The shut-down procedure according to claim 4, wherein the amount of reaction air added in step (B) is regulated to maintain the amounts of hydrogen and oxygen entering the inlet of the anode flow field below the flammability limit.

7. The shut-down procedure according to claim 1, wherein, in step (A), after said step of disconnecting the primary electricity using device but before said step of stopping the flow of fuel, the steps of stopping the flow of air into the cathode flow field and connecting, for a period of time, an auxiliary resistive load across the anode and cathode in an external circuit to reduce the cell voltage and cathode potential by consuming oxygen within the cathode flow field through normal fuel cell electrochemical reactions.

8. The shut-down procedure according to claim 7, wherein said period of time is until the cell voltage is reduced to 0.2 volts per cell or less, whereupon said step of stopping the flow of fuel is implemented.

9. The shut-down procedure according to claim 7, wherein said period of time is at least until substantially all the oxygen in the cathode flow field has been consumed.

10. The shut-down procedure according to claim 7, wherein step (B) includes the step of adding reaction air to the recycle loop upstream of the inlet to the anode flow field to provide additional oxygen for the catalytic reaction of hydrogen on the anode.

11. The shut-down procedure according to claim 8, wherein the cell voltage is limited to 0.2 volts per cell or less by using an appropriately sized diode in series with the auxiliary load.

12. The shut-down procedure according to claim 1, wherein in step (B), the step of catalytically reacting hydrogen includes passing the recirculating anode flow field exhaust through a burner disposed in the recycle loop, and catalytically reacting hydrogen in the recirculating anode flow field on a catalytic element within the burner.

13. The shut-down procedure according to claim 12, wherein reaction air is added to the burner in controlled amounts to provide oxygen for the catalytic reaction.

14. The shut-down procedure according to claim 12, including the step of adding a controlled amount of reaction air to the recirculating anode exhaust and diffusion burning hydrogen in the recirculating anode exhaust with that controlled amount of reaction air upstream of the catalytic element.

15. The shut-down procedure according to claim 14, wherein in step (A), after said step of disconnecting the primary electricity using device but before said step of stopping the flow of fuel, the steps of stopping the flow of air into the cathode flow field and connecting, for a period of time, an auxiliary resistive load across the anode and cathode in an external circuit to reduce the cell voltage by consuming oxygen within the cathode flow field.

16. The shut-down procedure according to claim 15, wherein an auxiliary resistive load is maintained across the anode and cathode throughout step (B).

17. The shut-down procedure according to claim 15, wherein the auxiliary resistive load is maintained across the anode and cathode for a period of time long enough to reduce the cell voltage to 0.2 volts or less per cell prior to said step of stopping the flow of fuel to the anode flow field.

18. The shut-down procedure according to claim 1, wherein said step (B) of catalytically reacting hydrogen includes passing the recirculating anode exhaust through the plurality of burners arranged in series within the recycle loop, each burner including a catalytic element therein, and delivering a separate controlled flow of reaction air into each of the catalytic burners to provide oxygen for a catalytic reaction of hydrogen with oxygen on the catalytic elements to produce water.

19. The shut-down procedure according to claim 17, wherein after said step of catalytically reacting hydrogen and oxygen in the burner, and after substantially no hydrogen remains in the recycle loop, purging the cathode and anode flow fields with air.

20. The shut-down procedure according to claim 6, wherein in step (B), the hydrogen in the anode exhaust is catalytically reacted with oxygen at the anode, and at least some of the oxygen reacted with the hydrogen at the anode is supplied by the reaction air added to the recirculating anode exhaust upstream of the inlet to the anode flow field.

21. The shut-down procedure according to claim 18, wherein, after said step of disconnecting the primary electricity using device, and prior to said step of stopping the flow of fuel into the anode flow field, connecting an auxiliary resistive load across the anode and cathode for a period of time long enough to reduce the cell voltage to a selected value per cell, prior to said step of stopping the flow of fuel to the anode flow field, and maintaining the resistive load across the anode and cathode throughout step (B) to keep the cell voltage low.

22. The shut-down procedure according to claim 21, wherein the selected value is 0.2 volts per cell or less.

23. The shut-down procedure according to claim 22, wherein, in step (B), after substantially all the hydrogen has been consumed, purging the anode and cathode flow fields with air.

24. The shut-down procedure according to claim 21, wherein a diode is used in series with the auxiliary resistive load to limit the cell voltage to the selected value.

25. A procedure for shutting down an operating fuel cell system, wherein, during operation of the fuel cell system, a continuous flow of oxidant is being provided to a fuel cell cathode from an oxidant source through a cathode flow field on one side of an electrolyte, and a continuous flow of hydrogen containing fuel is being provided to a fuel cell anode from a primary fuel source through an anode flow field on the other side of the electrolyte, and a portion of the anode flow field exhaust is recirculated through the anode flow field in a recycle loop, and an electric current is being generated by the fuel cell within an external circuit and is operating a primary electricity using device in the external circuit, the procedure including the following steps:

(A) disconnecting the primary electricity using device from the external circuit and stopping the flow of oxidant to the cathode flow field; and, then, with the flow of hydrogen containing fuel continuing into the anode flow field, (B) connecting an auxiliary resistive load across the anode and cathode for a period of time at least long enough to reduce the cell voltage to a selected value per cell, wherein during that period of time anode exhaust continues to circulate through the recycle loop, wherein upon the cell voltage reaching the selected value, or less, (C) stopping the flow of fuel into the anode flow field and catalytically consuming hydrogen in the circulating anode exhaust as it circulates in the recycle loop until substantially no hydrogen remains in the loop.

26. The shut-down procedure according to claim 25, wherein the selected value is 0.2 volts per cell or less.

27. The shut-down procedure according to claim 26, wherein after the cell voltage has been reduced to 0.2 volts or less, it is maintained at 0.2 volts or less throughout step (C) by a diode in series with the auxiliary load.

28. The shut-down procedure according to claim 26, wherein, after step (C), the anode and cathode flow fields are purged with air.

29. The shut-down procedure according to claim 25, wherein in step (C), the hydrogen is catalytically consumed by reacting with oxygen on a catalytic element within a burner disposed within the recycle loop, and air is introduced in controlled amounts into the recycle loop to provide the oxygen for said catalytic reaction.

30. The shut-down procedure according to claim 29, wherein the cell voltage is maintained at or below the preselected value throughout step (C).

31. The shut-down procedure according to claim 29, wherein in step (C), air introduced into the recycle loop is diffusion burned with hydrogen in the recycle loop in a diffusion zone upstream of the catalytic element.

32. The shut-down procedure according to claim 31, wherein the recycle loop includes a plurality of alternately diffusion burning zones and catalytic elements, in series, and in step (C) the recirculating anode exhaust passes through the series of zones and over said series of catalytic elements, alternately diffusion burning hydrogen and air and catalytically consuming hydrogen until substantially no hydrogen remains within the recycle loop.

33. The shut-down procedure according to claim 32, wherein the cell voltage is maintained at or below the preselected value throughout step (C).

34. The shut-down procedure according to claim 33, wherein, after step (C), the anode and cathode flow fields are purged with air.

* * * * *